J. A. BIDWELL.
Base-Plate for Artificial Teeth.
No. 126,174.                                   Patented April 30, 1872.
Fig. 1.             Fig. 2.
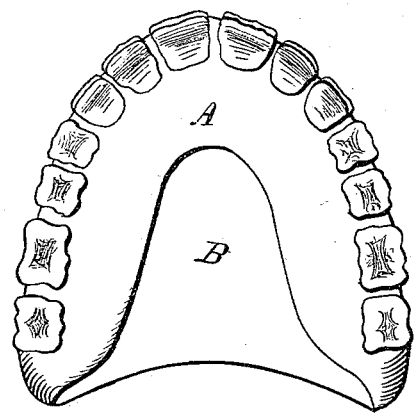  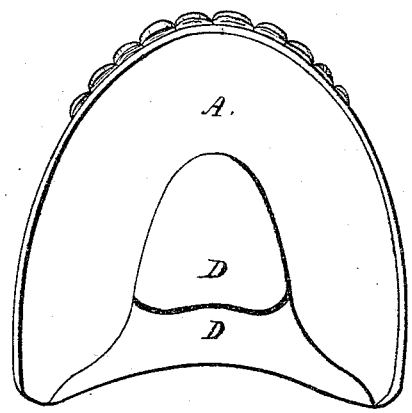
Fig. 3.
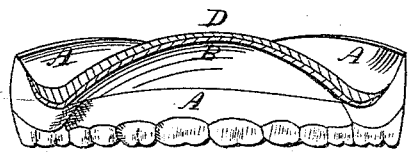
Witnesses:                                Inventor:
C. A. Bidwell                             Julius A. Bidwell
C. Hannum Harroun

UNITED STATES PATENT OFFICE.

JULIUS A. BIDWELL, OF TOLEDO, OHIO.

IMPROVEMENT IN BASE-PLATES FOR ARTIFICIAL TEETH.

Specification forming part of Letters Patent No. 126,174, dated April 30, 1872.

*To all whom it may concern:*

Be it known that I, JULIUS A. BIDWELL, of Toledo, county of Lucas, in the State of Ohio, have invented a new and Improved Mode of Constructing Base-Plates for Artificial Teeth; and I do hereby declare that the following is a full and exact description thereof, which will enable others skilled in the art to make and use the same, reference being had to the accompanying drawing and the letters of reference marked thereon.

The nature of my invention consists in providing base-plates of artificial teeth with two kinds of elastic India rubber, the lingual surface being of less flexibility than the principal part or palatine portion of the flexible rubber.

Figure 1 is an inverted plan of an upper set of artificial teeth, showing my improvement applied thereto. Fig. 2 is a top-plan view of a similar set of teeth, with my improvement applied thereto. Fig. 3 is a rear view of the palatine edge of the plate, showing the two kinds of flexible India rubber.

The objections to wearing elastic India rubber in the mouth are, first, the India rubber is too easily acted upon by the acids of the mouth, thereby becoming rough and offensive; second, from the same cause it becomes softened and spongy, loosing its elasticity and adaptation to the mouth.

In my improvement I am enabled to use a harder compound of elastic rubber for a coating on the lingual or portion of the plate most exposed than could otherwise be used, thus securing greater durability with an equal amount of flexibility.

I construct my plate of hard rubber or vulcanite in the ordinary way, except where I wish to insert the flexible part. This I add, making it about two-thirds as thick as the hard part of the plate, and then add a sufficient amount of the less flexible rubber to make it equally as thick as the hard or main portion of the plate.

In Fig. 1, A is the lingual surface of the hard part of the plate, and B is the coating or hard part of the flexible portion.

In Fig. 2, D is the palatine surface of the main or more flexible part of the plate.

Fig. 3 shows the edges of the two kinds of flexible India rubber, B and D.

I do not claim a flexible edge, as in patent of J. A. Straight of November 23, 1869; but What I do claim is—

A base-plate for artificial teeth in which the flexible piece extending from the central part to the rear edge of the plate is coated with a harder compound of rubber to protect it from the acids of the mouth.

JULIUS A. BIDWELL.

Witnesses:
  C. A. BIDWELL,
  C. HANNUM HARROUN.